United States Patent [19]
Wright

[11] Patent Number: 5,301,044
[45] Date of Patent: Apr. 5, 1994

[54] MARKING MATERIAL CONTAINING A TAGGANT, AND METHOD OF PRODUCING AN IMAGE

[75] Inventor: Joseph D. Wright, Burlington, Canada

[73] Assignee: Xerox Corporation, Stamford, Conn.

[21] Appl. No.: 28,872

[22] Filed: Mar. 10, 1993

Related U.S. Application Data

[62] Division of Ser. No. 636,264, Dec. 31, 1990, Pat. No. 5,225,900.

[51] Int. Cl.$^5$ .............................................. H04N 1/40
[52] U.S. Cl. ...................................... 358/500; 430/21
[58] Field of Search ............................... 358/500–501; 355/40, 204, 6–7; 430/15, 21, 526

[56] References Cited

U.S. PATENT DOCUMENTS

| | | | |
|---|---|---|---|
| 4,308,327 | 12/1981 | Bird et al. | 430/15 |
| 4,494,865 | 1/1985 | Andrus et al. | 355/32 |
| 4,543,308 | 9/1985 | Schumann et al. | 430/21 |
| 4,598,999 | 7/1986 | Kurata et al. | 356/380 |
| 4,716,438 | 12/1987 | Farrell | 355/6 |
| 4,728,984 | 3/1988 | Daniele | 355/6 |
| 4,757,348 | 7/1988 | Rourke et al. | 355/6 |
| 4,777,510 | 10/1988 | Russell | 355/7 |
| 4,834,360 | 5/1989 | Acquaviva | 271/3.1 |
| 4,862,217 | 8/1989 | Russel | 355/7 |
| 4,983,817 | 1/1991 | Dolash et al. | 235/462 |
| 5,093,147 | 3/1992 | Andrus et al. | 355/32 |

FOREIGN PATENT DOCUMENTS 0342060 11/1989 European Pat. Off. .
1-61777 3/1989 Japan .

OTHER PUBLICATIONS

N. D. Robinson, "Copy Sheet Size and Weight Sensing", *Xerox Disclosure Journal*, vol. 13, No. 4 (1988).

J. F. Stephany, Piezo-Optic Resonances in Crystals of the Dihydrogen Phosphate Type, Reprinted from Journal of the Optical Society of America, vol. 55, No. 2, 136–142, Feb. 1965.

C. L. Strong, The Amateur Scientist, Reprinted from Scientific American, Jul. 1962.

T. M. Dolash et al., Novel Bar Coding System for Nonletter Mail, Presented at Third Advanced Technology Conference, May 1988.

J. J. Garvey et al., An "Invisible" Bar Code, Information from Battelle, Dec. 1990.

W. G. Elwin, Coding Documents With Adjustable Copier Parameters, Kodak Research Disclosure No. 18348, Jul. 1979.

*Primary Examiner*—Stephen Brinich
*Attorney, Agent, or Firm*—Oliff & Berridge

[57] ABSTRACT

Taggants are incorporated into marking materials used to create images. Reproduction systems detect the taggants, and use the resulting information to control reproduction. The invention is particularly applicable to color correction, enhancement and translation; document identification; image preservation and highlighting; and document control and security.

20 Claims, 9 Drawing Sheets

MARKING MATERIAL CONTAINING A TAGGANT, AND METHOD OF PRODUCING AN IMAGE

This is a division of application Ser. No. 07/636,264 filed Dec. 31, 1990, now U.S. Pat. No. 5,225,900 issued Jul. 6, 1993.

BACKGROUND OF THE INVENTION

A reproduction system converts images on original documents into images on a printed copy. Reproduction systems may include display systems such as CRT displays, and printing systems such as lithographic, xerographic, ionographic, electronic reprographic, ink jet, thermal transfer and impact printing systems. They may use such marking materials as inks, toners, marking films and the like. Reproduction systems are capable of a broad range of functions, depending on the complexity of the machine performing the functions, and on the amount of information they are capable of storing and processing.

An electronic reprographic printing system is a system wherein an image on an original document is scanned and transformed into electronic image signals within the system's memory. Those signals are thereafter processed and the image is reproduced by display and/or printing on a substrate such as paper, transparency film, or the like. This system differs significantly from a conventional xerographic system which produces an image by a light coupling process. An electronic reprographic system is capable of performing a multiplicity of functions related to the images processed within the system.

For example, in electronic reprographic printing systems, a document or series of documents comprising at least one print job is successively scanned. Upon scanning of the documents, image signals are obtained and electronically stored. Once a document is scanned, it can be printed any number of times or processed in any number of ways (e.g., words deleted or added, image magnified or reduced, filtered, screened, cropped, etc.). If a plurality of documents makes up a job which is scanned, the processing or manipulation of the scanned documents can include deletion of one or more documents, reordering of the documents, or addition of a previously or subsequently scanned document or documents. The signals are then read out successively and transferred to a printer or display device for formation of images comprising some or all of the information on the original image as well as any other information added during the image processing stage. The printing or processing can be relatively synchronous with scanning, or asynchronous after scanning. The system can accumulate a number of scanned jobs in the system memory for subsequent processing or printing. The order of the jobs to be printed may be different from the order in which the jobs are scanned depending on the priority of the jobs and the desires of the operator for increasing productivity or through-put and decreasing printer or scanner down-time.

In addition to the image information which is entered into the system, other information needed to produce the final product may also be entered into the system by an operator. This information may relate to such factors as size of document, type of font, size of font, etc.

In a printing system such as an electronic reprographic system, several devices usually make up the total system, with separate devices or components providing the functions of scanning, processing, printing, and finishing (e.g., stapling, binding, etc.). The system includes a controller which provides for the overall monitoring and integrating of the performance of the aforementioned functions.

In an electronic reprographic system, the materials employed to "fix" the images being manipulated and processed in the system are substantially the same as those used in other copying or printing systems, and include the color marking materials, generally toners or ink-jet inks. As used herein, the term "color" includes black and other colors, except where otherwise clear from the context.

U.S. Pat. No. 4,543,308 to Schumann et al. describes electronic image recording in multiple colors using a photographic recording material comprising at least one layer of photo-sensitive silver halide and a compound capable of luminescence. The recording material is image-wise exposed and developed to produce a latent luminescence image. The image information contained in the latent luminescence image is scanned photoselectively by a luminescence spectroscopic process and is recorded electronically in the form of monochromatic luminescence signals.

U.S. Pat. No. 4,308,327 to Bird et al. discloses motion picture film having digitally coded sound tracks which are colorless and transparent, and which fluoresce when exposed to ultraviolet light. The sound track image is partially coded in the visible film image area using an electrostatic imaging system to imprint a fluorescent toner.

U.S. Pat. No. 4,777,510 to Russell discloses a method of producing color-accented reproductions of original documents, wherein originals are highlighted by a reader and the highlighted originals are serially passed during a copy run over an image scanner that is sensitive to the highlighted portions. The locations of the high-lighted portions for each original are detected and stored in a bit map. Such highlighting of an original may also be used to indicate areas to be selectively screened, filled within a screen tint, areas to be deleted or areas to be repositioned.

None of the aforementioned patents provide for incorporation of a taggant within the original marking material used to create an image on a document.

SUMMARY OF THE INVENTION

This invention relates to materials, methods and reproduction systems whereby information is obtained by means of at least one taggant contained in marking materials forming an image which is scanned by a reproduction system.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1.

DETAILED DESCRIPTION OF PREFERRED EMBODIMENTS

This invention relates to a method whereby a reproduction system obtains information from an image on a document entered into the system, by means of a taggant contained in the marking materials forming that image. A scanner is preferably used to obtain taggant information. The scanner may be, but need not be, a separate component connected to any image processor. For example, the invention may be used with a scanner connected to a light lens xerographic system. However this is a relatively inflexible system. Preferably, a scanner is incorporated into an electronic reprographic system as described above. This permits the image signals to be manipulated in numerous ways with a great degree of flexibility.

Marking materials may include visible materials such as toner, ink or marking film. They may also (or alternatively) include materials which are visible only in the ultraviolet or infrared portions of the light spectrum. Marking materials containing taggants may be applied to a substrate by any known means, preferably by a mechanical or electromechanical printing process such as lithography, xerography, ionography, electronic reprography, thermal transfer printing (for example by being incorporated in a thermal transfer film), ink jet printing, encapsulated marking material printing, or impact printing (for example through being incorporated into an impact printer ribbon such as a dot matrix or typewriter ribbon).

Toners generally are particulate compositions comprising a resin medium and a coloring agent and, as required, a charge controlling agent and other additives, with a specific particle diameter range. Generally, toners are either pressure-fixable or heat fixable.

A toner is used in the development of images on a copy document by a development station, for example a magnetic brush development station. The toner particles are agitated in the development station to exhibit a triboelectric charge of opposite polarity to a latent image charge pattern. The charged toner particles are selectively attracted to the oppositely charged latent image pattern. This toner-coated pattern is then transferred electrostatically or directly and converted by pressure and/or heat into an image on the copy substrate such as paper, transparency film or the like.

Toners suitable for use in electrophotographic copiers and printers may have a wide variety of colors, such as black, red, magenta, green, blue, cyan, brown, yellow, purple, silver and gold. When it is desired to highlight certain features of a document, two or more colored toners may be used. Partial or full color images can also be produced by developing images with a plurality of toners such as cyan, magenta and yellow, or red, blue and green, and black toners.

Generally, it is advantageous for such toners to exhibit low melting temperatures to enable low energy fusing of image patterns on substrates at low temperatures. It is also often advantageous for such toners to possess mean particle diameters of less than about 20, preferably less than about 10, microns to enable images of high resolution, low image noise and high color fidelity. Further, it is generally desirable for these small diameter toners to have very narrow size distributions, preferably in the range of a geometric size dispersity (GSD) of 1.0 to 1.5, more preferably 1.2 to 1.3, to avoid difficulties in electrophotographic development and transfer associated with oversize toner particles and extremely fine toner particles.

Inks generally used in an ink-jet printing system preferably comprise inks which are capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle. Known ink jet inks generally comprise a dye which is soluble in an ink vehicle such as water or a mixture comprising water and a water soluble or water miscible organic solvent. Suitable water miscible organic solvents include ethylene glycol, propylene glycol, diethylene glycols, glycerine, dipropylene glycols, polyethylene glycols, polypropylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). Heterophase ink jet inks are also known.

Inks generally contain a dye. Generally, any effective dye, such as one of the direct dyes or the acid dyes, can be selected as the colorant, provided that it is compatible with the other ink components and is soluble in the liquid vehicle. Examples of suitable dyes include anthraquinones, monoazo dyes, disazo dyes, phthalocyanines, aza(18)annulenes, and formazan copper complexes.

Polymeric additives can also be added to inks to enhance their viscosity. Such additives include water soluble polymers such as gum arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like. Polymeric additives may be present in inks in amounts of from 0 to about 5 percent by weight, and preferably from about 0.01 to about 2.5 percent by weight.

Other optional additives to inks include biocides such as Dowicil 150, 200, and 75, benzoate salts, sorbate salts, and the like, present in an amount of from about 0.0001 to about 4 percent by weight, and preferably from about 0.01 to about 2.0 percent by weight; humectants and penetration control additives such as ethylene glycol, diethyleneglycol, N-methylpyrolidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight; pH controlling agents such as acids or bases, phosphate salts, carboxylate salts, sulfite salts, amine salts and the like, present in an amount of from 0 to about 1 percent by weight and preferably from about 0.01 to about 1 percent by weight, or the like.

Inks can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. Any other suitable processes for preparing inks can also be employed.

Thermal transfer ribbons and impact printer ribbons are typically comprised of a substrate, usually a polyester film such as Mylar ® coated with one or more layers of waxy components which contain pigments or dyes as colorants. The waxes may include many different types, blended so as to ensure melting under controlled conditions in thermal transfer devices and release from the substrate under pressure in impact printing devices. The properties are also adjusted through various wax components to ensure that images adhere to the marking substrates such as paper or transparencies and do not smear. Waxes include but are not restricted to families of carnauba waxes, beeswax and the like. The pigments can be any of those used in toners or inks, as can the taggant materials.

According to the present invention, taggant materials are provided in the basic marking material (toner, ink or marking film) for subsequent identification by the printing system. A "taggant" is defined herein as an additive to the marking material which can be combined with a marking material composition, and is selectively detectable independently from the primary colorant (e.g., pigment or dye) of the marking material. Preferred taggants will respond to an external stimulus in a way that can be specifically recognized by a reproduction system. For example, a taggant may emit light (e.g., fluoresce) at a certain wavelength band, preferably a narrow band in a near ultraviolet or near infrared portion of the light spectrum, upon exposure to white, ultraviolet or infrared light. The system can recognize this emitted light and, through information programmed into its memory, identify the specific marking material associated with the taggant which emits light at that wavelength. The system can also access significant information in its memory relating to that marking material to perform various functions.

A taggant may be composed of a material which fluoresces or reflects light of visible or, preferably, "invisible" wavelengths. However, it should not interfere with the color of the marking material in which it is utilized within the image. For example, in a visible ink, the taggant would preferably fluoresce or reflect in an invisible (IR or UV) wavelength; for an "invisible" ink which reflects UV light, the taggant would preferably reflect or fluoresce in a separate part of the UV spectrum or in the IR spectrum. In a less preferred embodiment, the taggant would fluoresce or reflect light in a very narrow wavelength band within the same portion of the spectrum more broadly emitted or reflected by a colorant in the marking material. This would create a "peak" on the spectral response of the colorant which would be recognizable by a scanner, but which would not substantially interfere with perception of the image.

Taggants can be blended into toner, ink or marking film materials as an additive or can be chemically or physically bonded to one of the constituent materials in the toner or ink. It is possible to have a taggant attached chemically to a number of pigment or dye materials such that the marking material in which the taggant is incorporated may be identified by the system upon appropriate illumination by a scanner.

Generally any fluorescent dye may be selected as a taggant in inks or toners of the present invention. Exemplary taggant dyes for inks include, for example, 4,4'-bis(triazin-2-ylamino)stilbene-2,2'-disulfonic acids, 2-(stilben-4-yl)naphthotriazoles, 2-(4-phenylstilben-4-yl) benzoxazoles, 4,4-bis(triazo-2yl) stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide and the like.

Similarly, examples of fluorescent dyes suitable for use in particulate toners include stilbene derivatives such as 2-(4-phenylstilben-4-yl) benzoxazoles, 4,4'-bis(-triazin-2-ylamino)-2,2' disulfonic acids and the like; pyrazoline derivatives such as 1,3-diphenyl-2-pyrazoline and its derivatives; biphenyls such as 4,4-bis(styryl)-biphenyl and its derivatives; coumarins such as 4-methyl-7-aminocoumarin and 3-phenyl-7-(trazin-2-ylamino)-coumarin; carbostyrils such as 3-phenyl-7-nitrocarbostyril; dibenzothiophene-5,5-dioxides such as 3,7-diaminobenzothiophene-2,8-disulfonic acid-5,5-dioxide; pyrene derivatives; pyridotriazoles; and the like. Fluorescent pigments (e.g., fluorescent dye(s) incorporated in resin particles) are also particularly suitable as taggants.

When a taggant fluoresces or reflects light at a predetermined wavelength, the output light for each taggant can be detected and the presence or absence of taggant can be determined by equipment well known in the art. This information can then be processed further to perform, for example, the special functions of the printing system described herein. The necessary algorithms can readily be prepared by those of ordinary skill in the art without undue experimentation. They will generally include comparing the detected taggant wavelength to a "table" containing a plurality of taggant wavelengths and associated information maintained in the system memory. The "associated information" may include the identity of toners, inks or marking films containing the detected taggant(s) and the spectral response of colorants in those toners or inks; various types of instructional information for the reproduction system; or the like. The information accessed through use of the table permits precisely tailored control of the image reproduction. Many printing systems are capable of performing various specialized functions between the scanning and printing function such as color enhancement, correction and translation, document "dry-cleaning", and a number of security applications. These functions may be either enabled or controlled by the information made available by the present invention.

Where an original document is in color, the taggant may provide information related to the nature and color of the marking material in which the taggant is incorporated. For example, in a color reproduction process employing magenta, cyan and yellow toners, each toner may be provided with a taggant material specific to the particular toner or colorant therein. Upon production of a color document containing one or more of such taggant-containing toners, the one or more taggants remain in the developed document. Subsequently, these taggant materials can be recognized with appropriate apparatus.

Color correction, color enhancement, and color translation are important functions facilitated by the present invention. In reproducing color originals, three values (e.g., red, green, blue) are normally generated by a color scanner, and can then be used to calculate colorimetric data through any of a variety of techniques well known in the art. For colorimetrically accurate reproduction, the reproduction system must obtain accurate spectral response values (i.e., spectrophotometric curve) from the original, and replicate those values with colorimetric precision in the marking material it uses to generate the copy. Existing color copying systems can adequately replicate the spectral response values which reach their image processing equipment because they are designed to use specific marking materials with known spectral responses. These known marking materials may be combined in a known manner to achieve specified colors.

However, the spectral response values which reach the image processing equipment of existing reproduction systems are often inaccurate, because the marking materials of the original are generally unknown and variable. For example, a green colorant of one type may not be exactly the same color as a green colorant of another type. A conventional reproduction system will obtain an averaged value when it scans an image containing such a colorant, or an image containing a combination of colorants, and will use that averaged value as the basis for application of marking materials on the copy. This often results in the copy having a different color appearance from the original.

According to the present invention, however, a reproduction system will be able to identify the particular material forming the image being scanned by recognition of one or more taggants therein. From information preprogrammed into its memory, the system will be able to adjust the scanned color values to accurate colorimetric values using spectral response data for the specific marking materials identified, using algorithms which can readily be generated by those of ordinary skill in the art without undue experimentation upon reading the present specification. It can then create a reproduced image on a display device or via a printing system based on the actual spectral response values of the original image in a known manner. Thus the invention can provide for color correction in a simple manner based upon the incorporation of separate identifiable taggants in various marking materials. For example, a system scanning an ink jet original, having detailed information derived from the taggants in that ink and corresponding information in its memory as to the colorimetric properties of that ink, can readily create an accurate copy using toner particles which generally include different pigments or using the phosphors of a CRT display device.

To perform this color correction for any particular image, it is only necessary to know with what pigments or dyes the image was made. Only a low resolution scanner (sensor) is necessary to pick up the taggant wavelength needed to generate this additional information, as distinct from the high resolution scanner normally used to detect image information. This scanner may respond to a broad wavelength light source using very selective wavelength filters to select the taggant signals, or it may be tuned to specific wavelengths as from a laser light source.

Variants of color correction are also enabled by the present invention. For example, rather than precisely duplicating the original image, a specific color component of the original image can effectively be enhanced in the copy without enhancing other colors in the original image as might occur in existing reproduction systems. Alternatively, the detailed information about the original colors provided by the taggants in the inventive system can permit simplified translation from one set of colors to another. For example, an image containing a set of colors could be translated to an image containing complementary colors (e.g., the negatives of the first image colors); or to an image containing a more restricted set of colors (e.g., from a full-color image to a subset of the colors, e.g., a two-color image comprising a different color and shades of gray to represent other original colors, or an image comprising different shades of a single color (e.g., a gray scale or "black-and-white" image)).

A system of the present invention may also be employed so that the text of a document and annotations on the document can be separately identified either as being a part of an original document or as being subsequently applied marks. If marks are subsequently applied to documents produced from marking materials containing taggants as described above, these marks can be separately identified and distinguished. Ink or pencil annotations can be distinguished from the taggant-containing toner, ink or marking film material in the original image. For example, an original image may be formed using a marking material containing a taggant. When marks are subsequently applied to the original, these marks can be distinguished from the original image. Upon reproduction, the original image can be reproduced with or without the subsequently applied marks. This can, for example, be used to make a clean copy from a document that has been annotated or, to the contrary, to make a copy in which annotations are high-lighted or are even the only image copied. The scanner identifies the taggant material and distinguishes it from "untagged" material, and utilizes the information during reproduction.

Taggants may also provide security for important documents. The system of the present invention is capable of identifying documents (as well as marking materials) containing taggants which may be present in the toner or ink used to create an image on the document. Thus, copies made using such toner or ink doped with taggant can be readily identified. This can permit subsequent identification of the source of an image, generally by type of machine (e.g., for statistical data gathering) or more specifically by facility where a copy was made or even by the specific machine unit in which a copy was made (e.g., for document tracking).

Documents or portions thereof may also be made incapable of being copied by using tagged marking materials for at least the portion of the document for which protection is desired. The identification of a predetermined taggant may signal the system to prevent scanning, storing or developing operations, of the whole document or areas where the particular taggant is present. Similarly, images made by machines which do not provide taggants can readily be distinguished from taggant containing images, thus facilitating document control.

Figure 1:
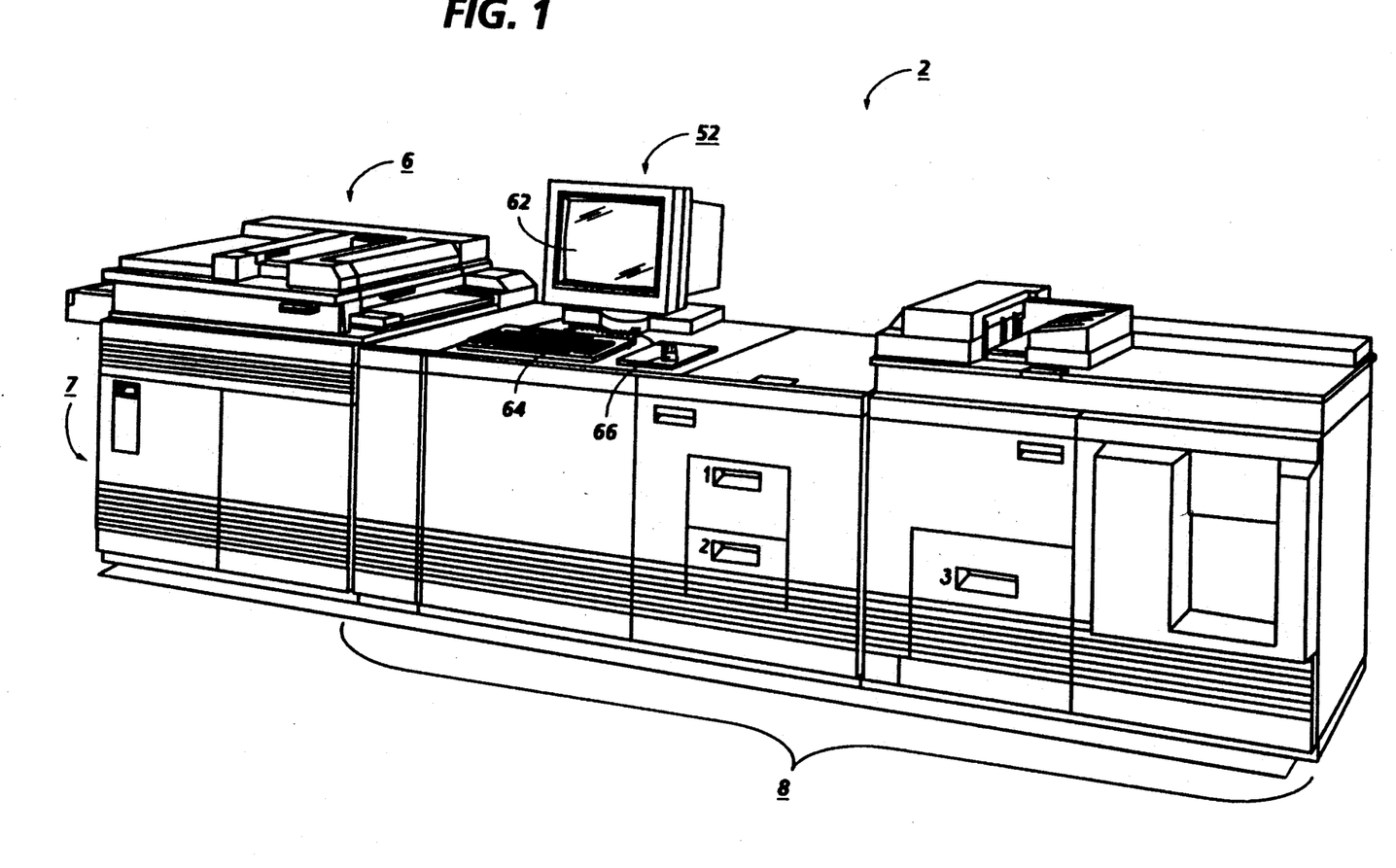
FIG. 1 depicts an electronic printing system incorporating the present invention.
Figure 2:
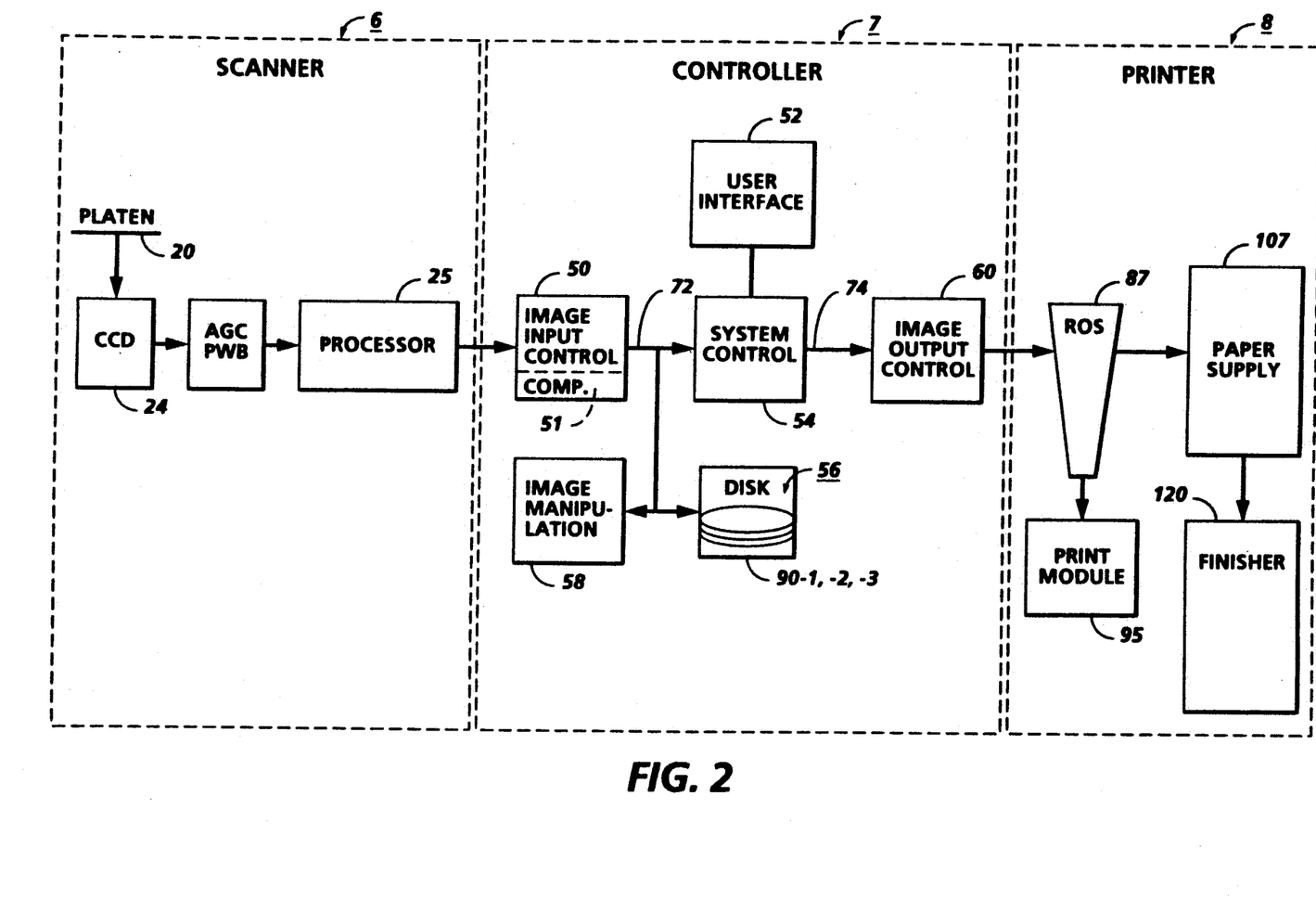
FIG. 2 is a block diagram depicting the major elements of the printing system shown in FIG. 1.

Referring now to the drawings, and particularly to FIGS. 1 and 2 thereof, there is shown an exemplary electronic reprographic printing system 2 for processing print jobs in accordance with the present invention. Printing system 2, for purposes of explanation, is divided into a scanner section 6, controller section 7, and printer section 8. While a specific printing system is shown and described, the present invention may be used with other types of printing systems such as ink jet marking systems, ionographic systems, xerographic systems, lithographic systems, thermal transfer systems or ribbon-oriented direct marking systems.

Figure 3:
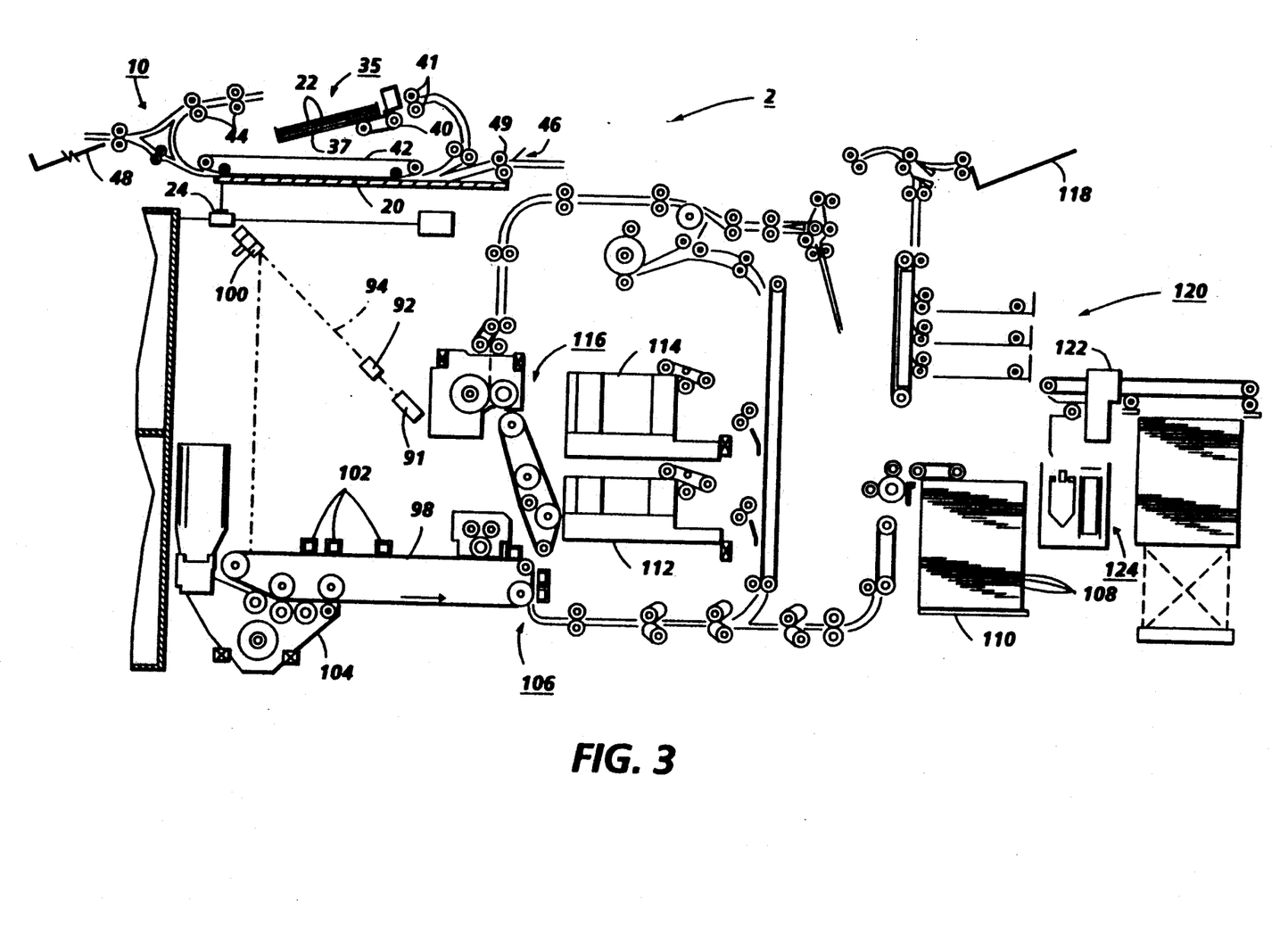
FIG. 3 is a plan view illustrating the principal mechanical components of the printing system shown in FIG. 1.
Figure 4:
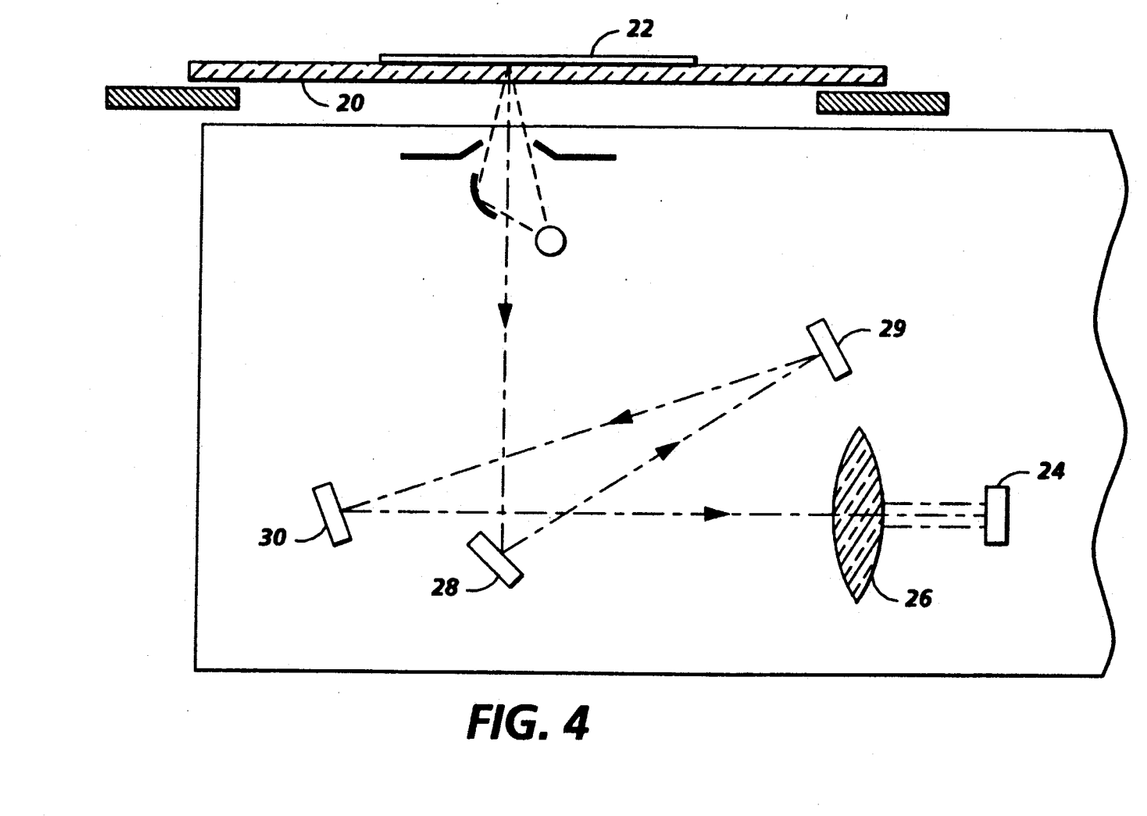
FIG. 4 is a schematic diagram showing certain construction details of a document scanner of the printing system shown in FIG. 1.

Referring particularly to FIGS. 2-4, scanner section 6 incorporates a transparent platen 20 on which the document 22 to be scanned is located. At least one linear array 24 is supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7. Scanner 6 may also include at least one separate scanner component of low resolution and comprising filters and/or light sources capable of detection in the UV and IR regions, or this function may be incorporated into the main scanner. The function of this additional scanner component is to process information about the presence or absence of color toners or inks and/or taggants in marking materials.

The taggant scanner component could include a broad wavelength illumination source with a narrow wavelength filter for each taggant to be detected. Alternatively, the taggant scanner component could include at least one narrow wavelength illumination source (such as a laser), and at least one specific wavelength sensor.

Processor 25 converts the analog image signals output by array 24 to digital image signals, and processes the digital image signals as required to enable system 2 to store and handle the image data in the form required to carry out the job programmed. Processor 25 also provides enhancements and changes to the image signals such as filtering, thresholding, screening, cropping, reduction/enlarging, etc.

Documents 22 to be scanned may be located on platen 20 for scanning by automatic document handler (ADH) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 may comprise a laser type printer and, for purposes of explanation, is separated into a Raster Output Scanner (ROS) section 87, print module section 95, paper supply section 107, and finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by toner or developer at 104 and transferred at transfer station 106 to a print media 108 delivered by media supply section 107. Media 108 may comprise any of a variety of materials (e.g., paper, transparency film or the like), sheet sizes, types, and colors. For transfer, the print media are brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged either to output tray 118, or to finisher 120. For color printers, the above process is repeated for each color, the color images being overlaid to form the final image. Finisher 120 includes a stitcher 122 for stitching or stapling the prints together to form books and a thermal binder 124 for adhesively binding the prints into books.

Figure 5A:
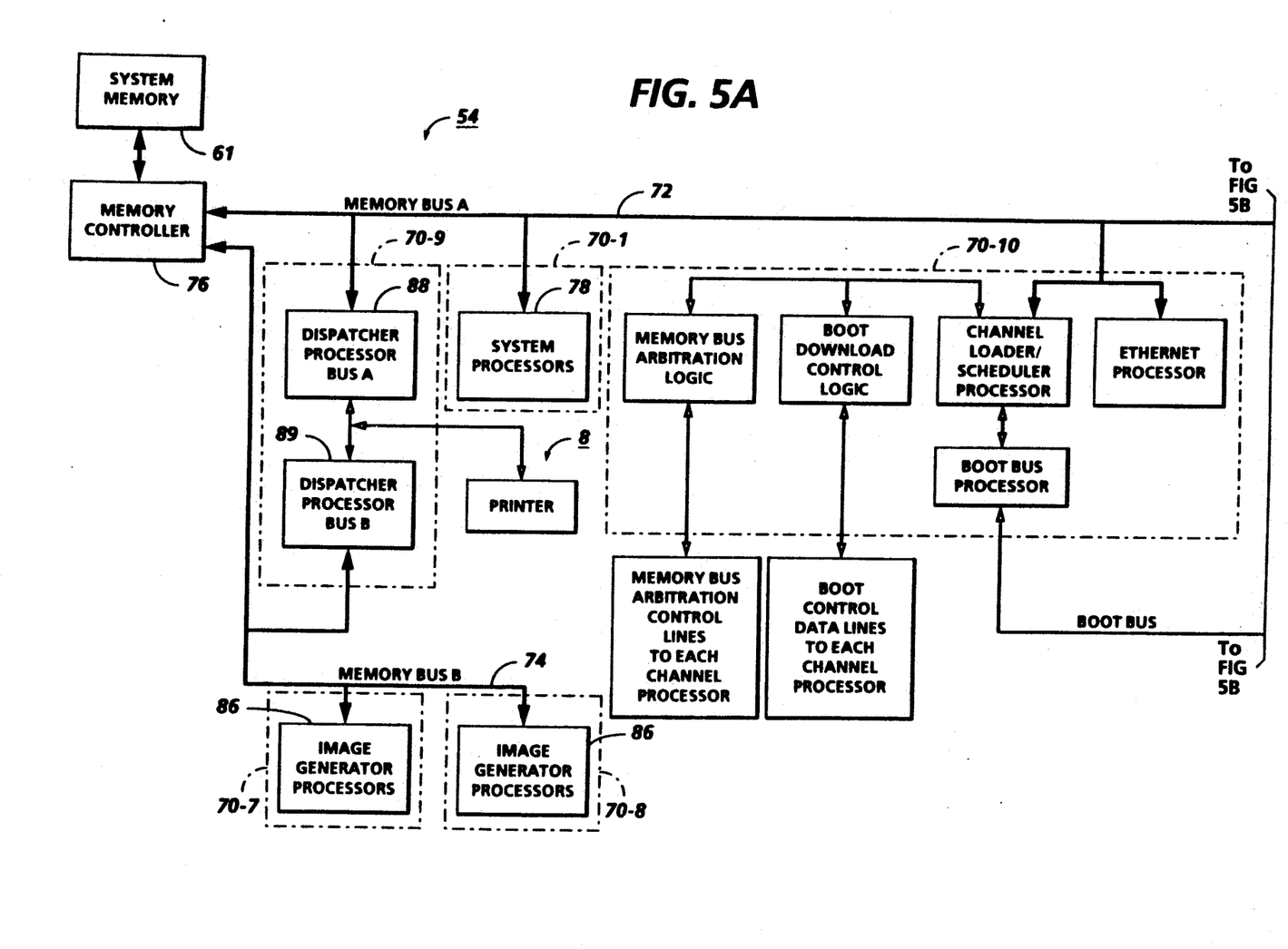
FIGS. 5A, 5B and 5C comprise a schematic block diagram showing the major parts of the control section for the printing system shown in FIG. 1.
Figure 5B:
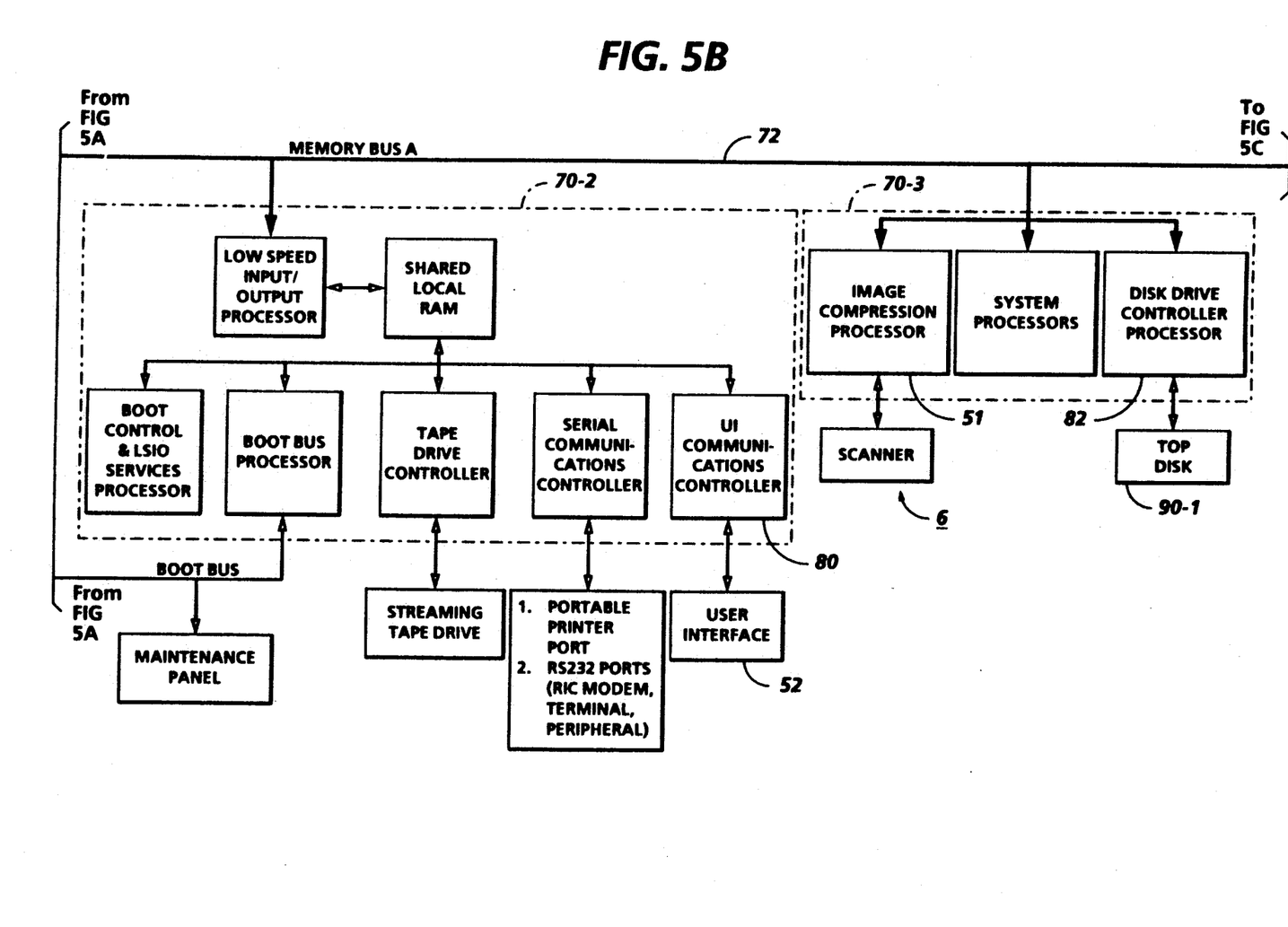
Figure 5C:
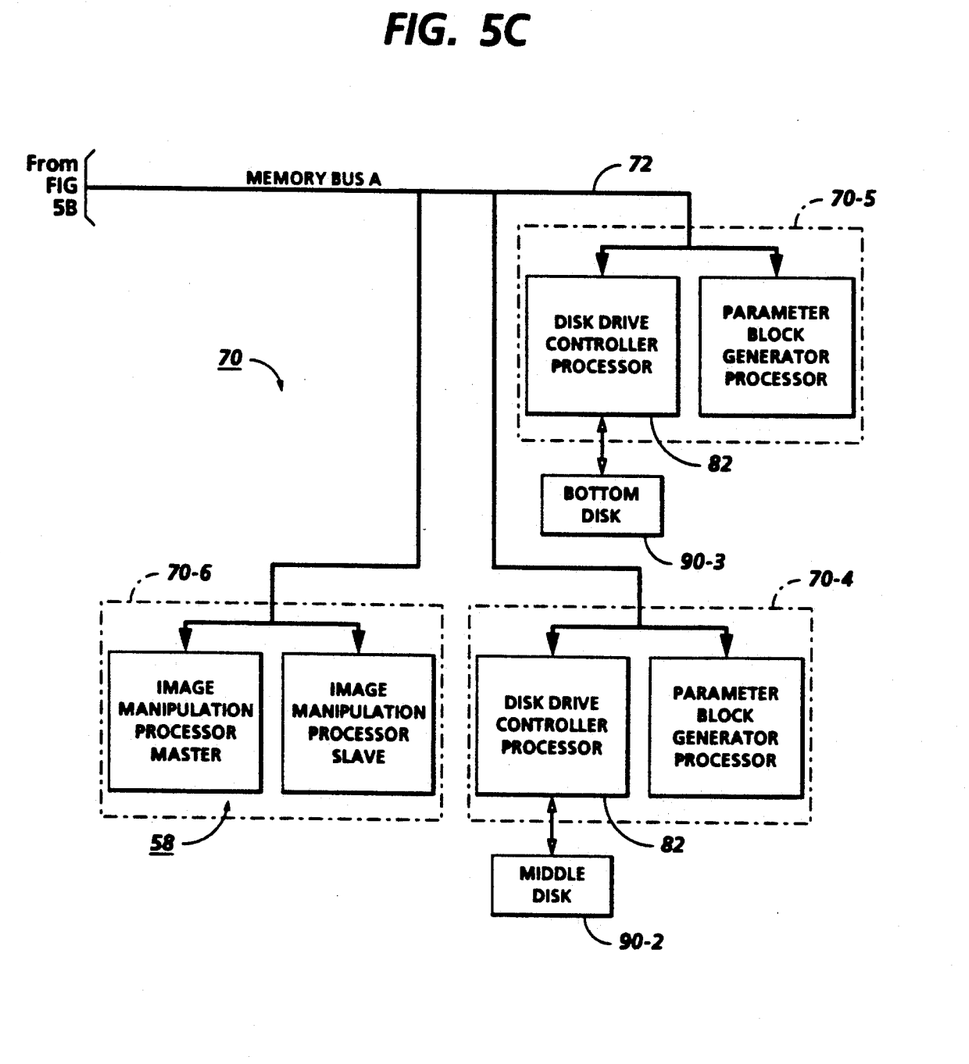

Referring to FIGS. 1, 2 and 5, controller section 7 is, for explanation purposes, divided into an image input controller 50, User Interface (UI) 52, system controller 54, main memory 56, image manipulation section 58, and image output controller 60.

Referring particularly to FIGS. 5A-5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data, together with slice pointers and any related image descriptors providing image specific information (such as height and width of the document in pixels, the compression method used, pointers to the compressed image data, and pointers to the image slice pointers), are placed in an image file. The image files, which represent different print jobs, are temporarily stored in system memory 61 which comprises a Random Access Memory or RAM pending transfer to main memory 56 where the data is held pending use.

As best seen in FIG. 1, User Interface 52 includes a combined operator controller/CRT display comprised of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine operating system software, machine operating data, taggant information and tables, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as color image processing, color correction, enhancement and translation, security processing, high-lighting, collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
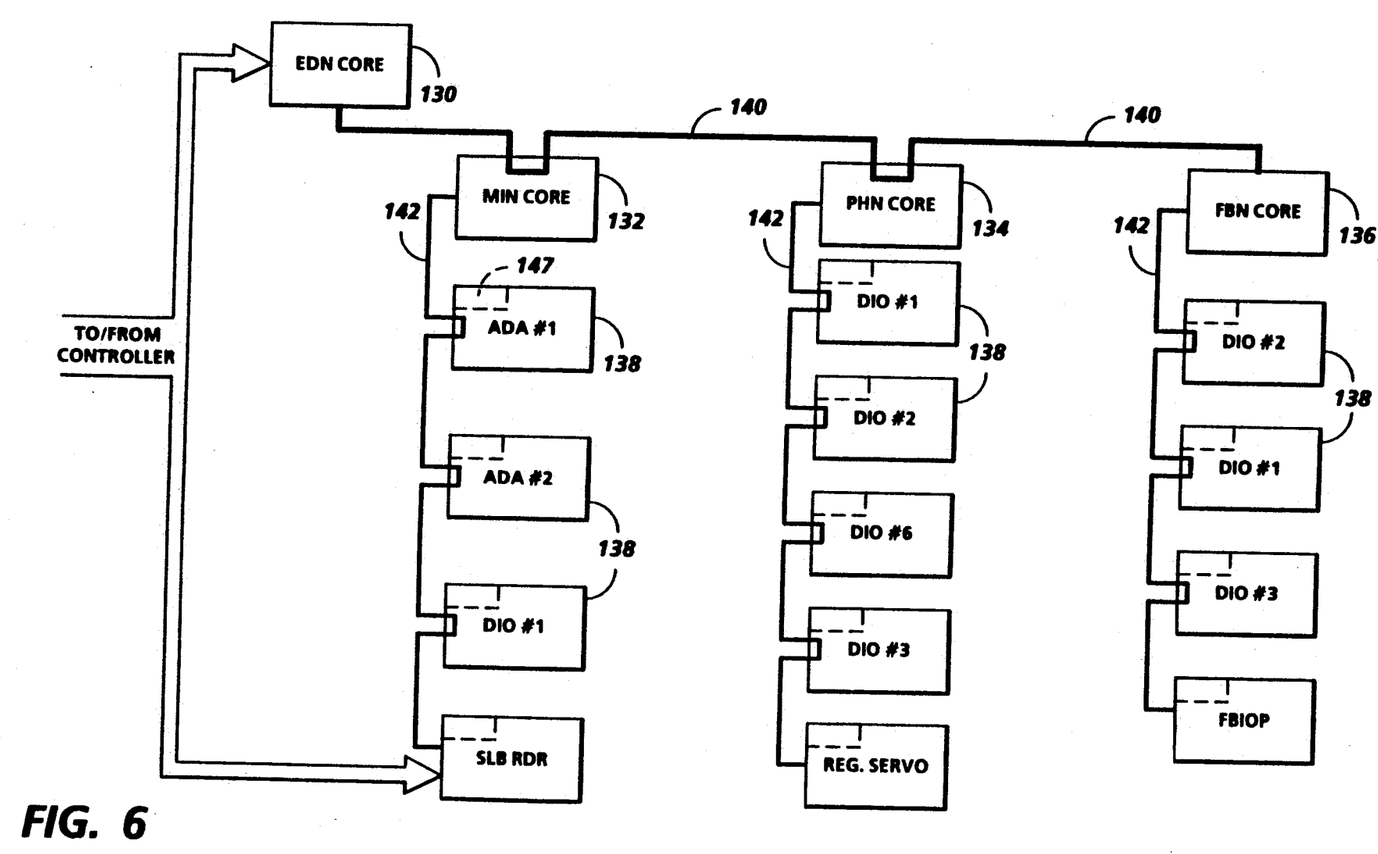
FIG. 6 is a block diagram of an operating system, together with printed wiring boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

While the invention has been described with reference to particular preferred embodiments, the invention is not limited to the specific examples given, and other embodiments and modifications can be made by those skilled in the art without departing from the spirit and scope of the invention.

What is claimed is:

1. A method of producing an image, comprising imagewise applying at least one marking material containing a taggant to a substrate by a mechanical or electromechanical printing process to form said image on said substrate.

2. A method of claim 1, wherein said printing process is selected from the group consisting of lithography, xerography, ionography, electronic reprography, impact printing, ink jet printing and thermal transfer printing.

3. A method of claim 1, wherein said marking material is selected from the group consisting of toner, ink jet ink, encapsulated marking material and marking film.

4. A method of claim 1, wherein at least two said marking materials of different colors and containing different taggants are applied to said substrate.

5. A method of claim 1, wherein said marking material contains a colorant which emits or reflects visible light and said taggant reflects or emits only ultraviolet or infrared light.

6. A method of claim 1, wherein said marking material contains a colorant which reflects or emits light in one portion of the light spectrum, and said taggant reflects or emits light in a distinguishable portion of the light spectrum.

7. A method of claim 6, wherein said distinguishable portion of the light spectrum is a very narrow wavelength band within said one portion of the light spectrum.

8. A method of claim 6, wherein said one portion of the light spectrum does not overlap with said distinguishable portion of the light spectrum.

9. A method of claim 6, wherein said one portion of the light spectrum is one member selected from the group consisting of ultraviolet light and infrared light, and said distinguishable portion of the light spectrum, is the other member of said group.

10. A marking material comprising a taggant and a colorant, said marking material being specially adapted for use in a mechanical or electromechanical printing process.

11. A marking material of claim 10, wherein said marking material is a toner.

12. A marking material of claim 10, wherein said marking material is an encapsulated marking material.

13. A marking material of claim 10, wherein said marking material is an ink jet ink.

14. A marking material of claim 10, wherein said marking material is incorporated in an impact printer ribbon or thermal transfer film.

15. A marking material of claim 10, wherein said colorant emits or reflects visible light, and said taggant reflects or emits only ultraviolet or infrared the light.

16. A marking material of claim 10, wherein said colorant reflects or emits light in one portion of the light spectrum, and said taggant reflects or emits light in a distinguishable portion of the light spectrum.

17. A marking material of claim 16, wherein said distinguishable portion of the light spectrum is a very narrow wavelength band within said one portion of the light spectrum.

18. A marking material of claim 16, wherein said one portion of the light spectrum does not overlap with said distinguishable portion of the light spectrum.

19. A marking material of claim 18, wherein said one portion of the light spectrum is one member selected from the group consisting of ultraviolet light and infrared light, and said distinguishable portion of the light spectrum, is the other member of said group.

20. A marking material of claim 10, wherein said taggant is a fluorescent pigment or dye.

* * * * *